United States Patent Office 3,422,162
Patented Jan. 14, 1969

3,422,162
PRODUCTION OF HEAVY ALKYLATE
Wilfred John Oldham, Polmont, Falkirk, and John Scott Orr, Dollar, Scotland, assignors, by mesne assignments, to Grange Chemicals Limited, London, England, a British company
No Drawing. Filed Aug. 1, 1966, Ser. No. 569,082
Claims priority, application Great Britain, Aug. 12, 1965, 34,634/65
U.S. Cl. 260—671       14 Claims
Int. Cl. C07c 3/52; C07c 15/02

ABSTRACT OF THE DISCLOSURE

The production of heavy alkylate may be substantially increased by the process which comprises treating at least a part of a feedstock containing one or more olefins of 8 to 16 carbon atoms with liquid anhydrous hydrogen fluoride thereafter bringing the thus treated feedstock into contact with an aromatic compound containing at least one aromatic ring having no alkyl substituents in the presence of an alkylation catalyst, separating heavy alkylate from the resultant mixture and recovering the heavy alkylate.

---

This invention relates to the production of heavy alkylate.

"Heavy alkylate" is one of the products of the alkylation of aryl compounds with $C_8$-$C_{16}$ olefines and is the residue left when the detergent alkylate (i.e. the monoalkyl aryl compounds having an alkyl side chain of between 8 and 16 carbon atoms which are used for detergent sulphonate manufacture) has been distilled off.

Heavy alkylate when sulphonated is used as an additive for lubricating oils. At times when the prices of heavy alkylate is high relative to detergent alkylate, it may be desirable to increase the proportion of heavy alkylate in the product from the alkylation of the aromatic compound with the olefine without any loss of quality of the detergent alkylate.

We have found that a suitable pretreatment of the olefine used to alkylate the aromatic compound increases the yield of heavy alkylate and gives a heavy alkylate which can be sulphonated satisfactorily.

According to the present invention a process for the production of heavy alkylate comprises the successive steps of (a) treating at least part of a feedstock containing one or more olefins having from 8 to 16 carbon atoms in the molecule with liquid anhydrous hydrogen fluoride,
(b) bringing the feedstock into contact with an aromatic compound, containing at least one aromatic ring having no alkyl substituents, in the presence of an alkylation catalyst,
(c) separating heavy alkylate from the resulting mixture.

The olefine used may be any olefine having from 8 to 16 carbon atoms, but a particularly useful heavy alkylate is obtained when the olefine is propylene tetramer which is obtained by the polymerisation of propylene and consists mainly of branched-chain olefines generally having a chain length in the range $C_9$ to $C_{15}$, with $C_{12}$ olefines predominating. The feedstock should be substantially free of aromatic compounds.

The aromatic compound may be any aromatic compound having an aromatic ring with no alkyl substituents, such as benzene or naphthalene, and is preferably benzene.

The alkylation catalyst used may be any of the commonly used alkylation catalysts, e.g. aluminium chloride or hydrogen fluoride. The use of hydrogen fluoride is preferred, and in this case the necessary prior contact of the olefine with the hydrogen fluoride may be obtained by introducing the olefine and aromatic compound at separate points into an alkylation reactor containing hydrogen fluoride so that the olefine comes into contact with the hydrogen fluoride before coming into contact with the aromatic compound. Alternatively a proportion of the olefine feed may be contacted with hydrogen fluoride outside the alkylation reactor, a procedure which is generally more convenient and more easily controlled with continuous alkylation units, especially as benzene should be excluded during the pretreatment of the olefin with hydrogen fluoride.

The pretreatment may be carried out in one or more vessels separate from the alkylation reactor containing the aromatic compound and alkylation catalyst and the olefin feedstock separated from the bulk of the hydrogen fluoride and passed to the alkylation reactor. The process of the present invention is most suitably carried out however by using hydrogen fluoride as the alkylation catalyst and running hydrogen fluoride and olefin feedstock together down a common tube to the reactor containing the aromatic compound. The length of the tube and rate of flow govern the time for which the hydrogen fluoride and olefin are in contact, and provided that the absence of aromatic compounds from the hydrogen fluoride is ensured, the aromatic compound in the reactor cannot come into contact with the olefin feedstock until the feedstock enters the alkylation mixture.

The proportion of olefine contacted with the anhydrous hydrogen fluoride before being contacted with the aromatic compound will depend on the quantity of heavy alkylate required. The increase in heavy alkylate production due to the hydrogen fluoride pretreatment depends on the proportion of olefine contacted with the hydrogen fluoride before contact with the aromatic compound, and the time for which this contact takes place. The temperature at which the hydrogen fluoride pretreatment takes place is preferably within the range $-100°$ C. to $+100°$ C., more particularly below 50° C. It is especially preferred to use temperatures below 20° C. Generally the proportion of olefine fed to the hydrogen fluoride pretreatment should not exceed 50% of the total quantity of olefine contacted with the aromatic compound. Where this proportion is over 50% there may be an increase in unwanted side reactions and in the formation of tarry by-products. The mole ratio of olefine to hydrogen fluoride in the pretreatment may vary within quite wide limits.

The feedstock, after at least part of it has been treated with hydrogen fluoride, is then fed to the alkylation reaction, i.e. is brought into contact with the aromatic compound and the alkylation catalyst. The feedstock fed to the alkylation includes the feedstock treated with hydrogen fluoride and that part, if any, of the feedstock which was not treated.

The alkylation reaction is carried out using the conventional reaction conditions. The mole ratio of aromatic compound to olefin is generally high. The mixture of alkyl benzenes obtained from the alkylation of the aromatic compound after removing hydrogen fluoride by conventional means is fractionally distilled in known manner to give light alkylate, which is the fraction which distills off before the detergent alkylate, and a residue of heavy alkylated products. Where the heavy alkylate is to be used for the production of lubricating oil additives, for which heavy alkylates having an average molecule weight over about 350 are required, the average molecular weight may be increased by further distillation of the residue to remove lighter components if necessary. With the process of the invention, heavy alkylate products of average molecular weight exceeding 350 will normally be obtained without recourse to such further fractionation.

The invention is illustrated by the following examples, the results of which are set out in the table.

EXAMPLE 1

(a) A conventional batch alkylation of tetrapropylene to benzene not according to the invention at a benzene to olefine mole ratio of 20:1 produced 8.2 parts of light alkylate boiling below 230° C.; 131.1 parts of detergent alkylate boiling between 230° and 320° C. and 8.6 parts of heavy alkylate boiling above 320° C. for every 100 parts of olefine feed. In this alkylation the benzene and olefine were intimately mixed before being added to the reactor.

(b) In an alkylation according to the invention using the same reactants in the same proportions the olefine and benzene were added to the reactor, which already contained hydrogen fluoride, concurrently through separate inlets. The result was that 7.7 parts of light alkylate; 108.4 parts of detergent alkylate; and 24.2 parts of heavy alkylate were produced boiling at temperatures similar to those from the normal alkylation. The heavy alkylate in this case on analysis by infrared spectroscopy contained a larger monoalkylbenzene content than did the product from the normal alkylation.

EXAMPLE 2

In another batch alkylation using conventional methods and not according to the invention the benzene to olefine mole ratio was reduced from 20:1 to 3:1 but conditions were otherwise as in Example 1(a). This alkylation produced 7.2 parts of light alkylate; 93.4 parts detergent alkylate; and 34.8 parts of heavy alkylate. This heavy alkylate however was very largely para disubstituted and contained only a little monoalkylbenzene. This heavy alkylate sulphonated incompletely and with difficulty. The detergent alkylate produced was a poor quality, particularly as regards colour. This illustrates the poor results obtained by merely decreasing the benzene:olefine ratio in the conventional hydrogen fluoride alkylation.

EXAMPLE 3

In this experiment, olefine and hydrogen fluoride were contacted prior to mixing with the benzene, which was charged (20 moles) to the reactor separately and cooled (to avoid evaporation of hydrogen fluoride) prior to adding olefine and hydrogen fluoride. One mole of propylene tetramer and 20 moles of anhydrous hydrogen fluoride were fed down a common pipe three feet long, over a period of an hour. To avoid excessive loss of hydrogen fluoride the container in which it was kept during the period of the addition was cooled with solid carbon dioxide chips while the porton of the pipe in which the tetrapropylene and hydrogen fluoride were contacted was jacketed with an ice/water mixture. The temperature of the reactor was kept the same as in the alkylation of Examples 1 and 2 i.e. 12–14° C. In this case 20.5 parts of light alkylate; 36.7 parts of detergent alkylate; and 54.4 parts of heavy alkylate were produced. The heavy alkylate was found from its infrared spectrum to be almost wholly monoalkylbenzene.

EXAMPLE 4

The alkylation of Example 3 was repeated except that the hydrogen fluoride prior to its addition to the tetrapropylene was cooled with an ice/water mixture and the mixing tube was maintained at the same temperature as the reactor. This alkylation gave 9.9 parts of light alkylate; 36.4 parts of detergent alkylate, and 51.4 parts of heavy alkylate. The heavy alkylate as before proved to be almost wholly mono-alkyl benzene.

The results of Examples 1 to 4 are set out in Table 1.

TABLE 1.—HEAVY ALKYLATE PRODUCTION IN HF CATALYSED PROCESS FOR MAKING DETERGENT ALKYLATE

| Example | Benzene/olefine mole/ratio | Type of alkylation | Yield in parts per 100 parts olefine feed | | | Aromatic substitution of heavy alkylate |
|---|---|---|---|---|---|---|
| | | | Light alkylate, <230° C. | Detergent alkylate, 230°–320° C. | Heavy alkylate, >320° C. | |
| 1(a)* | 20:1 | Olefine and benzene intimately mixed before addition to reactor. | 8.2 | 131.1 | 8.6 | Para dialkyl benzene and monoalkyl benzene. |
| 1(b) | 20:1 | Olefine and benzene added separately to reactor. | 7.7 | 108.4 | 24.2 | Para dialkyl benzene and rather more monoalkyl benzene than in (1). |
| 2* | 3:1 | Olefine and benzene intimately mixed before addition to reactor. | 7.2 | 93.4 | 34.8 | Almost wholly para dialkyl benzene. |
| 3 | 20:1 | Olefine pretreated with HF:HF and olefine cooled. | 20.5 | 36.7 | 54.4 | Almost wholly monoalkylbenzene. |
| 4 | 20:1 | Olefine pretreated with HF. | 9.9 | 36.4 | 51.4 | Do. |

* Example 1(a) and Example 2 are not according to the invention.

EXAMPLE 5

In these tests propylene tetramer was treated with liquid anhydrous hydrogen fluoride in a continuous stirred reactor under three different conditions. The total products were then reacted with benzene in a continuous stirred reactor using anhydrous hydrogen fluoride as catalyst, the alkylation temperature being 34–36° C., the pressure 50 p.s.i.g. and the contact time 8 minutes. The benzene to olefin mole ratio was 40:1, and the volume ratio of HF to olefin in the alkylation was about 4.1:1. The pretreatment conditions and the yields of products obtained are shown in Table 2.

TABLE 2.—ALKYLATION OF HF TREATED PROPYLENE TETRAMER WITH BENZENE

| Period | A | B | C |
|---|---|---|---|
| HF pretreatment conditions: | | | |
| Temperature, ° C | −22 | −21 | −51 |
| Contact time, mins | 5.5 | 34 | 11 |
| Volume ratio HF:tetramer | 0.33 | 0.24 | 0.32 |
| Alkylate composition, wt. percent (benzene free): | | | |
| Light alkylate, (boiling below 230° C.) | 17.4 | 25.2 | 21.8 |
| Detergent alkylate (boiling 230–320° C.) | 35.7 | 25.4 | 31.2 |
| Heavy alkylate (boiling over 320° C.) | 46.9 | 49.4 | 47.0 |
| Heavy alkylate: | | | |
| Ratio of di-/mono substituted alkyl benzenes | 0.2 | 0.2 | 0.2 |
| Mean molecular weight | 355 | 371 | 426 |

It is possible to increase the yield of heavy alkylate by other methods than pretreatment of the olefin with hydrogen fluoride, e.g. by reducing the ratio of aromatic compound to olefine. However as Example 2 shows this gives a heavy alkylate which can be sulphonated incompletely and only with difficulty, and a detergent alkylate which is of poor quality. The heavy alkylate produced in Example 2 was found to consist mainly of dialkyl benzenes and the di-substitution causes the difficulty and incompleteness of sulphonation. The heavy alkylate produced by the present invention has been found to be mainly mono-alkyl benzenes and is therefore sulphonated more readily.

We claim:

1. A process for the production of heavy alkylate which comprises the successive steps of
   (a) treating at least part of a feedstock containing one or more olefines of 8 to 16 carbon atoms in the molecule with liquid anhydrous hydrogen fluoride;
   (b) then bringing the thus treated feedstock into contact with an aromatic compound containing at least one aromatic ring having no alkyl substituents in the presence of an alkylation catalyst;
(c) separating heavy alkylate from the resulting mixture; and
(d) recovering the heavy alkylate.

2. A process according to claim 1 wherein the olefine having from 8 to 16 carbon atoms is propylene tetramer.

3. A process according to claim 1 wherein the aromatic compound is benzene.

4. A process according to claim 1 wherein the alkylation catalyst is anhydrous hydrogen fluoride.

5. A process according to claim 1 wherein the olefine is brought into contact with the hydrogen fluoride in a first vessel or set of vessels and is then brought into contact with the aromatic compound and the alkylation catalyst in a second vessel or set of vessels.

6. A process according to claim 4 wherein the feedstock and hydrogen fluoride are mixed and passed together into a reactor containing the aromatic compound.

7. A process according to claim 1 wherein not more than 50% of the total olefine feed is brought into contact with the anhydrous hydrogen fluoride before being brought into contact with the aromatic compound.

8. A process according to claim 4 wherein the heavy alkylate is separated from the mixture resulting from the alkylation of the aromatic compound by distilling off the detergent alkylate and lower boiling constituents under reduced pressure.

9. A process according to claim 1 wherein the feedstock is brought into contact with the hydrogen fluoride at temperatures in the range $-100°$ C. to $+100°$ C.

10. A process according to claim 8 wherein the temperature is below 50° C.

11. A process according to claim 9 wherein the temperature is below 20° C.

12. A process according to claim 1 wherein the mole ratio of aromatic mompound to olefin is greater than 3:1.

13. A process according to claim 12 wherein the mole ratio is in the range of from 20:1 to 40:1.

14. A process according to claim 2 wherein the aromatic compound is benzene and a high molar ratio of benzene to propylene tetramer is employed.

References Cited

UNITED STATES PATENTS

| 2,830,106 | 4/1958 | Good et al. | 260—683.15 |
| 2,886,609 | 5/1959 | Hakala et al. | 260—683.15 |

FOREIGN PATENTS 910,540  11/1962  Great Britain.

DELBERT E. GANTZ, *Primary Examiner.*

C. R. DAVIS, *Assistant Examiner.*